United States Patent Office 3,444,260
Patented May 13, 1969

3,444,260

METHOD FOR PREPARING BUTADIENE

Charles L. Thomas, Swarthmore, Pa., assignor to Sun Oil Company, Philadelphia, Pa., a corporation of New Jersey No Drawing. Filed Sept. 5, 1967, Ser. No. 665,230
Int. Cl. C07c 5/18
U.S. Cl. 260—680 6 Claims

ABSTRACT OF THE DISCLOSURE

Butadiene is prepared by reacting butene with air or oxygen in the presence of a platinum catalyst which is in the form of a metallic gauze at temperatures of from 750°–1,000° C. for contact times of less than 0.1 second.

BACKGROUND OF THE INVENTION

This invention relates to an improved process for the preparation of butadiene by the high temperature oxidation of butene in the presence of a platinum catalyst which is in the form of a metallic gauze.

The preparation of butadiene from butene has been described in U.S. Patent No. 3,168,587. The process recited therein provides for the dehydrogenation of butene in the presence of a platinum group metal catalyst supported on a non-acidic support. Small amounts of oxygen are also included for the apparent purpose of burning coke off of the catalyst as it accumulates. While this process does result in the improved performance of the dehydrogenation catalyst, it is nevertheless characterized in being a highly endothermic reaction requiring the input of large amounts of heat. Moreover, the catalyst itself, in addition to being sensitive to coke deposits and therefore requiring frequent regeneration, even with the addition of small amounts of oxygen, is costly to make and must in any event normally be used in pelletized form in cumbersome fixed or fluidized beds.

It is therefore, an object of this invention to provide an improved process for preparing butadiene from butene, utilizing a catalyst system which will avoid certain of the aforementioned disadvantages inherent in the prior art. More particularly, it is an object of this invention to provide a process for the preparation of butadiene wherein there is employed a self-sustaining oxidation reaction, using a simple metal catalyst which does not require regeneration, yet which permits the use of extremely high space velocities of feed input together with contact times as low as 0.0001 second.

SUMMARY OF THE INVENTION

In accordance with the present invention, it has now been found that butadiene may be prepared by passing a mixture of butene-1 or butene-2, or a mixture thereof, and oxygen or air over a platinum catalyst which is in the form of a metallic gauze at temperatures of from about 750° C. to 1,000° C. for contact times of less than 0.1 second. The reaction product may then be readily recovered by quenching it immediately downstream of the catalyst gauze by injecting a suitable coolant, followed by distillation of the resulting mixture.

DESCRIPTION OF THE PREFERRED EMBODIMENTS

In carrying out the process of this invention, a variety of reactors may be employed. One such type of reactor which may be adapted for use in the instant process is described in Kirk-Othmer's "Encyclopedia of Chemical Technology," vol. 9 (1952), at p. 334, where a horizontally disposed converter is provided inside with horizontal layers of platinum gauze which can be electrically heated. Suitable means for introducing and mixing the butene and air or oxygen, and conventional quenching means may be readily provided using devices known to those skilled in the art.

The catalyst, which is preferably platinum, or a 90:10 mixture by weight of platinum and rhodium, in the form of layers of metallic gauze, or screen, is equipped with heating elements for starting the reaction. The layers generally total anywhere from about 5 to 20 in number, and may be placed about 0.01 inch apart. The average mesh size of the platinum gauze is about 80–100 mesh. It should be noted that applicant's process, utilizing this type of catalyst is particularly advantageous in that it is in a convenient form for handling and placing in the reactor as contrasted with pelletized catalysts which must be arranged in the form of beds and the like. Also, this process is especially advantageous in that the reaction may proceed for several days without interruption inasmuch as conventional catalyst regeneration is unnecessary.

To start the reaction the gauze is first heated to reaction temperature, and the mixture of butene and air or oxygen is then supplied to the reactor. Thereafter, the exothermic reaction on the surface of the gauze provides sufficient heat to keep the catalyst at reaction temperature, so that the electricity may be turned off. It is thus a particular advantage of this process that aside from the initial heating of the catalyst gauze, no additional external heat need be supplied to the reactor. Instead, the reaction is self-sustaining, and no added heating or cooling of the reactor is necessary. However, if desired, the feed may be preheated by recycling the hot products through an appropriate heat exchanger.

The product is then readily recovered by quenching the reactor effluent immediately downstream of the catalyst gauze or heat exchanger by the injection of a suitable coolant such as water or the butene starting material itself. The butadiene may then be recovered from the coolant by distillation.

The molecular ratio of butene to oxygen may be varied over limits ranging from 2:1 to 4:1 and preferably should be from 2.5:1 to 3.5:1. It is essential that at least one part oxygen or air per four parts of butene be employed inasmuch as at lower ratios there will not be sufficient oxygen present to provide enough heat to maintain a self-sustaining oxidation reaction. This may be overcome in part by preheating the reactants. Moreover, when the ratio of butene to oxygen drops below about 2:1, there is produced increasing amounts of carbon monoxide and water. It will be understood, of course, that air may be used instead of pure oxygen.

The reaction temperatures employed are desirably in the range of from about 750°–1,000° C., and preferably are from 800° to 900° C., while the contact time of the feed with catalyst is generally less than 0.1 second, and may be as low as 0.0001 second. The process is generally operated at atmospheric pressure, but pressures ranging from five (5) atmospheres to fifty (50) mm. of mercury may be employed if desired.

The extremely fast reaction rate sresulting from the combination of the high temperatures and short contact times described above, together with the use of a metallic gauze catalyst, makes it possible to obtain very high space velocities in carrying out this process, and therefore, higher yields. By space velocities is meant the relationship of volumes of gas per volume of catalyst per hour. Thus, for example, space velocities in the range of from 5,000 to 10,000 volumes are possible when utilizing optimum operating conditions.

The following examples are included to further illustrate the present invention.

EXAMPLE 1

A reactor is provided with a catalyst consisting of 90 parts by weight of platinum and 10 parts by weight of rhodium. The catalyst is in the form of 100-mesh gauze made from wire 0.003 inch in diameter, and is horizontally disposed in the reactor in five layers spread 0.01 inch apart. The catalyst is heated electrically to 950° C., and a feed comprising three volumes of butene-1 and one volume of oxygen is introduced into one end of the reactor. The gaseous mixture, which has been preheated to 500° C., is passed over the catalyst at a linear velocity of five feet per second for a contact time of 0.001 of a second. The electricity is turned off, and the self-sustaining reaction is continued in the presence of the glowing gauze catalyst for ten days. The effluent gases are rapidly quenched with butene-1 and the butadiene recovered by absorption and distillation. The unreacted and the quench butene are recycled.

EXAMPLE 2

250 volumes of butene-2 and 500 volumes of air are charged to the reactor described in Example 1. The catalyst is heated electrically to a temperature of 850° C., and after the reaction has been initiated, it is turned off. The feed is passed over the glowing catalyst at a linear velocity of six feet per second for a period of five days. The effluent gases are quenched with steam, butadiene is recovered from the resulting solution by distillation, and the unreacted butene-2 is recycled to the reactor.

EXAMPLE 3

Repeateding the process of Example 1, but utilizing a feed consisting of 97% by volume of butene-1 and 3% of oxygen, it is found that as soon as the electricity to the catalyst gauze is turned off, the gauze stops glowing and the reaction stops.

What is claimed is:

1. A process for the preparation of butadiene which comprises contacting, in the absence of free halogen or hydrogen halide, a mixture comprising butene and oxygen with a platinum catalyst in the form of a metallic gauze at a temperature of about 750° to 1,000° C for a contact time of less than about 0.1 second, the molecular ratio of said butene to said oxygen being such as to maintain a self-sustaining reaction.

2. The process according to claim 1 wherein the butene is butene-1.

3. The process according to claim 1 wherein the butene is butene-2.

4. The process according to claim 1 wherein the molecular ratio of butene to oxygen is from about 2:1 to 4:1.

5. The process according to claim 1 wherein the catalyst is platinum.

6. The process according to claim 1 wherein the catalyst is a 90:10 mixture by weight of platinum and rhodium, respectively.

References Cited

UNITED STATES PATENTS

| | | | |
|---|---|---|---|
| 3,156,735 | 11/1964 | Armstrong | 260—680 |
| 3,168,587 | 2/1965 | Michaels et al. | 260—680 |
| 3,260,767 | 7/1966 | Bajars | 260—680 |

PAUL M. COUGHLAN, Jr., *Primary Examiner.*